United States Patent
Kamasuka

(10) Patent No.: US 8,773,681 B2
(45) Date of Patent: Jul. 8, 2014

(54) CONTROLLING FUNCTION IN AN IMAGE FORMING APPARATUS BASED ON SERVER SETTING INFORMATION

(75) Inventor: Atsushi Kamasuka, New Hyde Park, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 13/081,889

(22) Filed: Apr. 7, 2011

(65) Prior Publication Data

US 2011/0267636 A1 Nov. 3, 2011

(30) Foreign Application Priority Data

Apr. 28, 2010 (JP) ................................. 2010-104236

(51) Int. Cl.
*G06K 15/00* (2006.01)
(52) U.S. Cl.
USPC ......... 358/1.14; 726/1; 726/2; 726/7; 726/19; 726/27
(58) Field of Classification Search
USPC .................. 715/273, 741–748, 762–765, 809
See application file for complete search history.

(56) References Cited

U.S. PATENT DOCUMENTS

| 2008/0168542 A1* | 7/2008 | Sato ................................... 726/5 |
| 2009/0128844 A1 | 5/2009 | Kondo et al. |
| 2009/0222914 A1* | 9/2009 | Ozawa ............................ 726/21 |
| 2010/0002250 A1* | 1/2010 | Sakagami et al. ........... 358/1.14 |

FOREIGN PATENT DOCUMENTS

JP 2009-123009 A 6/2009

OTHER PUBLICATIONS

U.S. Appl. No. 13/080,245, filed Apr. 5, 2011.

* cited by examiner

*Primary Examiner* — Benny Q Tieu
*Assistant Examiner* — Marcellus Augustin
(74) *Attorney, Agent, or Firm* — Fitzpatrick, Cella, Harper & Scinto

(57) ABSTRACT

If an MFP has not received setting information from a server at startup, it refers to setting information stored in a nonvolatile storage unit which stores setting information received in the last operation. This enables the MFP to start with some functions available in accordance with the last setting information referred to, while the MFP waits for reception of setting information at startup.

15 Claims, 7 Drawing Sheets

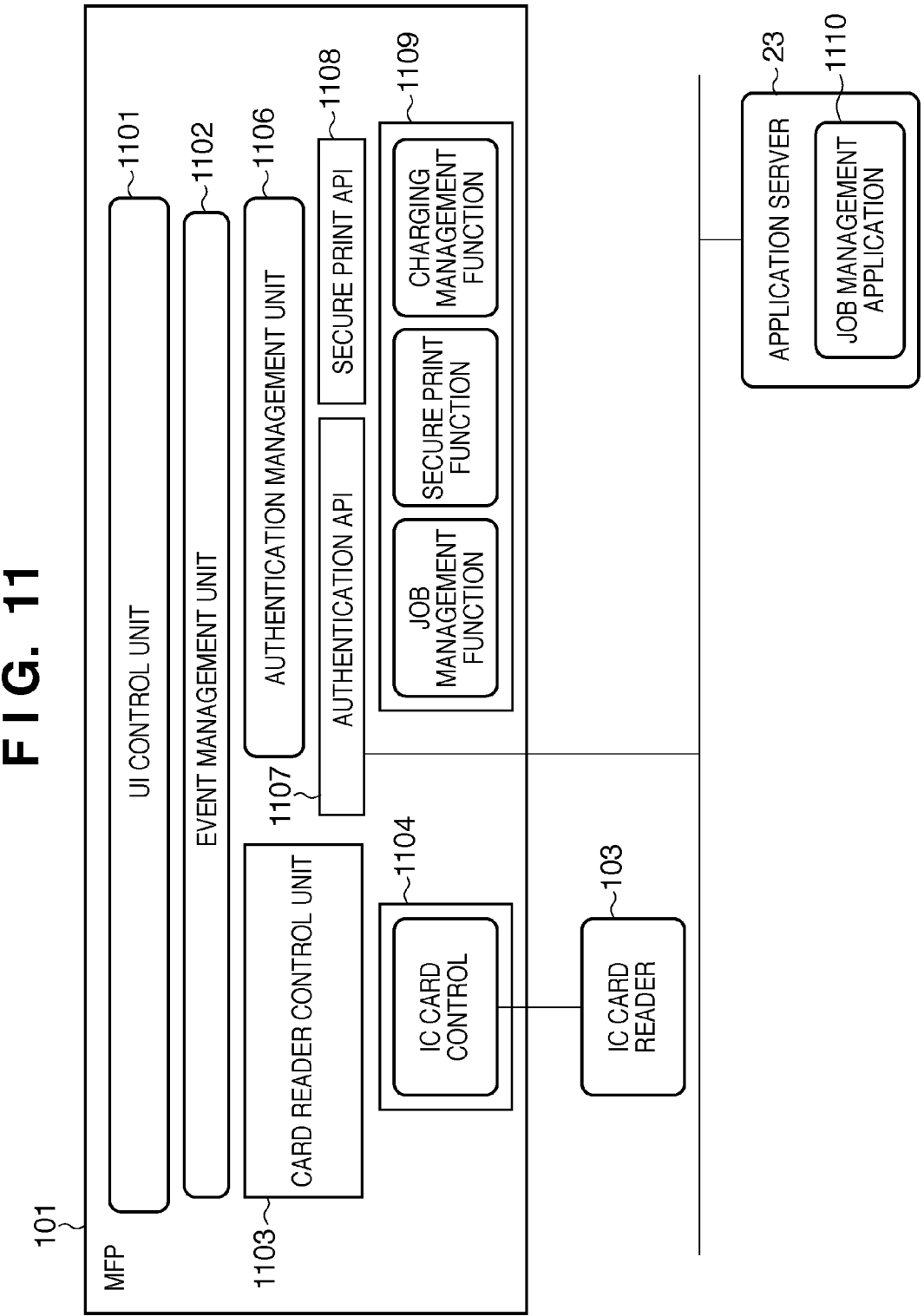

CONTROLLING FUNCTION IN AN IMAGE FORMING APPARATUS BASED ON SERVER SETTING INFORMATION

BACKGROUND OF THE INVENTION

1. Field of the Invention

The present invention relates to an image processing apparatus which, for example, receives setting information from an application server, and operates based on the received setting information, and an image forming method.

2. Description of the Related Art

There has been an increase in the number of MFPs which not only have an authentication function to impose user restriction on an apparatus as a whole but also on some functions (for example, a transmission function) of the apparatus. In this specification, authentication for the use of an apparatus itself is referred to as device authentication. Authentication limited to specific functions of an apparatus is referred to as application authentication. For example, for a customer who wants to allow everyone to freely use a copy function but restrict the use of a transmission function to authorized users having passed authentication, application authentication may be a preferred solution.

In general, authentication used by an MFP is often determined based on setting information preset in the MFP. That is, a system administrator or a serviceman who installs the MFP makes proper settings, and then the MFP starts/operates based on the set setting information.

On the other hand, in terms of low installation cost/low maintenance cost, some MFPs have no setting function, and start/operate based on setting information held in an external application server. For example, the following method has been proposed (see, for example, Japanese Patent Laid-Open No. 2009-123009). That is, UI setting information for each user is registered in a server in advance. An MFP receives UI setting information corresponding to a user ID used to log in the MFP, and customizes its UI (User Interface).

In a system in which a server makes settings of an MFP, the setting information of the server may contain setting information directly exerting an influence on the start processing of the MFP such as "device authentication or application authentication" for selecting an authentication service. In such system, the MFP cannot complete its start processing unless it has received basic setting information associated with the start processing from the server.

Therefore, the MFP generally displays a message indicating "waiting for setting information of a server" on the UI, and does not perform authentication until reception of the setting information is completed, thereby keeping the user wait. Also, as for an MFP which is used only through application authentication, it is impossible to use all the functions of the MFP until setting is completed every time the MFP restarts, thereby deteriorating the operability.

Moreover, an MFP may continuously be in a state of "waiting for setting information of a server" for a long time due to a server being down or network failure. In this situation, in spite of application authentication, it is impossible to use all the functions of the MFP during down time, resulting in very inconvenience.

SUMMARY OF THE INVENTION

The present invention has been made in consideration of at least one of the above conventional examples, and provides an image forming apparatus, and a control method therefor. Note that in the image forming apparatus, even before it receives setting information from a server, some functions the use of which is not restricted are usable.

The present invention comprises the following arrangement.

According to one aspect of the present invention, an image forming apparatus which operates based on setting information received from a server, comprises: an operation unit, configured to display a user interface screen; a storage unit, configured to store a type of authentication service contained in the setting information; a display control unit, configured to display an acceptance screen for accepting a user operation on the operation unit, when the setting information has not been received from the server after the startup of the image forming apparatus and the type of authentication service stored in the storage unit is function-specific authentication; and a unit, configured to store in the storage unit, when the setting information is received from the server, the type of authentication service contained in the setting information.

According to the present invention, it is possible to improve the usability of an image forming apparatus. For example, even before the apparatus becomes operable by receiving the setting information of a server, some functions the use of which is not restricted are available. This prevents deterioration of operability. Furthermore, even when the apparatus cannot access the server, some functions which do not have usage restrictions imposed are usable, thereby improving user operability.

Further features of the present invention will become apparent from the following description of exemplary embodiments (with reference to the attached drawings).

BRIEF DESCRIPTION OF THE DRAWINGS

FIG. 11 is a view showing program modules within the MFP 101.

DESCRIPTION OF THE EMBODIMENTS

First Embodiment

Figure 1:
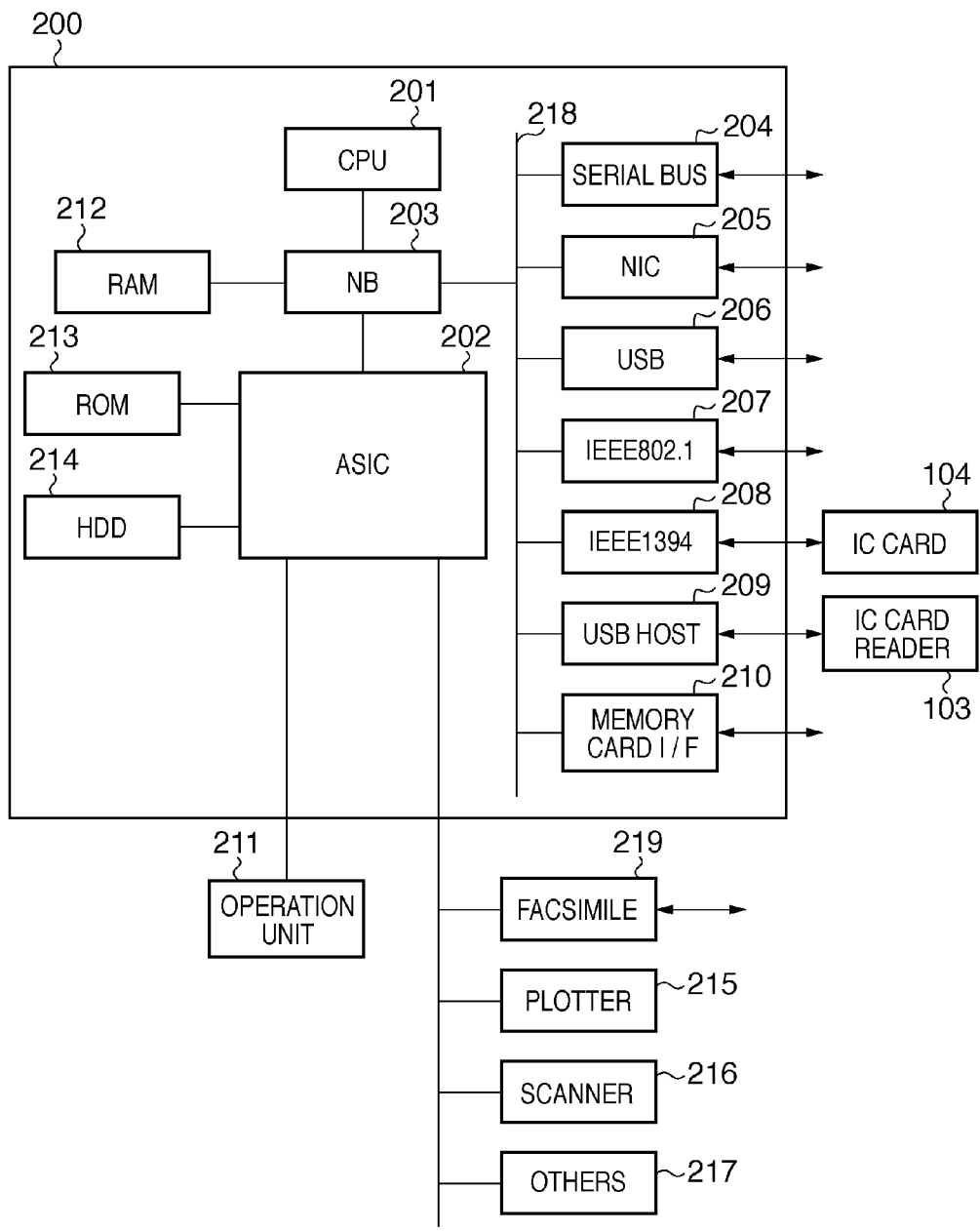
FIG. 1 a block diagram showing the hardware configuration of an image processing apparatus according to an embodiment of the present invention.

An embodiment of the present invention will be described below with reference to the accompanying drawings. FIG. 1 is a block diagram showing the hardware configuration of a multi function peripheral (MFP) exemplifying an image forming apparatus according to the embodiment of the present invention. The image forming apparatus may be a single function apparatus having a printer or scanner. Note that an MFP may be referred to as an image input/output apparatus since image input/output is more important than image processing. An MFP 101 includes a controller 200, an operation unit 211, a facsimile control unit 219, a plotter 215, a scanner 216, and other hardware resources 217. The controller 200 controls the MFP as a whole. The operation unit 211 having an operation panel is used for processing and operation setting of the MFP. The operation unit 211 includes a display panel, and can display a user interface. The facsimile control unit 219 performs facsimile control and the plotter 215 produces a hard copy of an image. The scanner 216 reads a document. The scanner 216 and plotter 215 respectively function solely, and also function as an input/output mechanism of a facsimile. Furthermore, the scanner 216 and plotter 215 can cooperate to make a copy. It is also possible to transmit/receive image data using a medium (or protocol) other than a facsimile.

The controller 200 includes a CPU 201 for controlling the MFP as a whole, an ASIC 202 for the controller including an operation unit I/F, CPU I/F, PCI I/F, and memory controller, and an NB (North Bridge) 203. The NB 203 has a bus controller, and the like, and intervenes between the ASIC 202, a PCI bus 218, a RAM 212, and the CPU 201. The ASIC 202 is also connected with an HDD 214 and a ROM 213. The PCI bus 218 is connected to a serial bus 204, a network interface card 205, a USB device 206, a wireless LAN interface 207, an IEEE1394 bus 208, a USB host 209, a memory card I/F 210, and the like. The HDD 214 is a nonvolatile storage medium, and can store image data, and information indicating a type of authentication service contained in setting information received from a server. The network interface card (to be referred to as an NIC hereinafter) 205 has a function of connecting to a network, and can connect to the server through this function. The USB device 206 can connect with a PC terminal, and the like. The wireless LAN interface 207 conforms to, for example, the IEEE802.11 standard. The USB host 209 serves as an interface for connecting an IC card reader 103, and the like via a USB cable. The memory card I/F 210 serves as an interface for reading out data from a memory card, and writing data into a memory card. The PCI bus 218 connects the ASIC 202 with the facsimile control unit 219, plotter 215, scanner 216, and other hardware resources 217.

The CPU 201 is connected with the IC card reader 103 by a USB cable via the NB 203, PCI bus 218, and USB host 209, and controls the IC card reader 103 by transmitting commands to it. Access to an IC card 104 is attained when the IC card reader 103 communicates with the IC card 104. The IC card reader 103 serves as an interface for reading out/writing data from/in the contact or non-contact type IC card 104. If, for example, user authentication information is recorded in the IC card 104, it is possible to read out the information recorded in the IC card using the IC card reader 103, and undergo authentication based on the readout authentication information.

Figure 2:
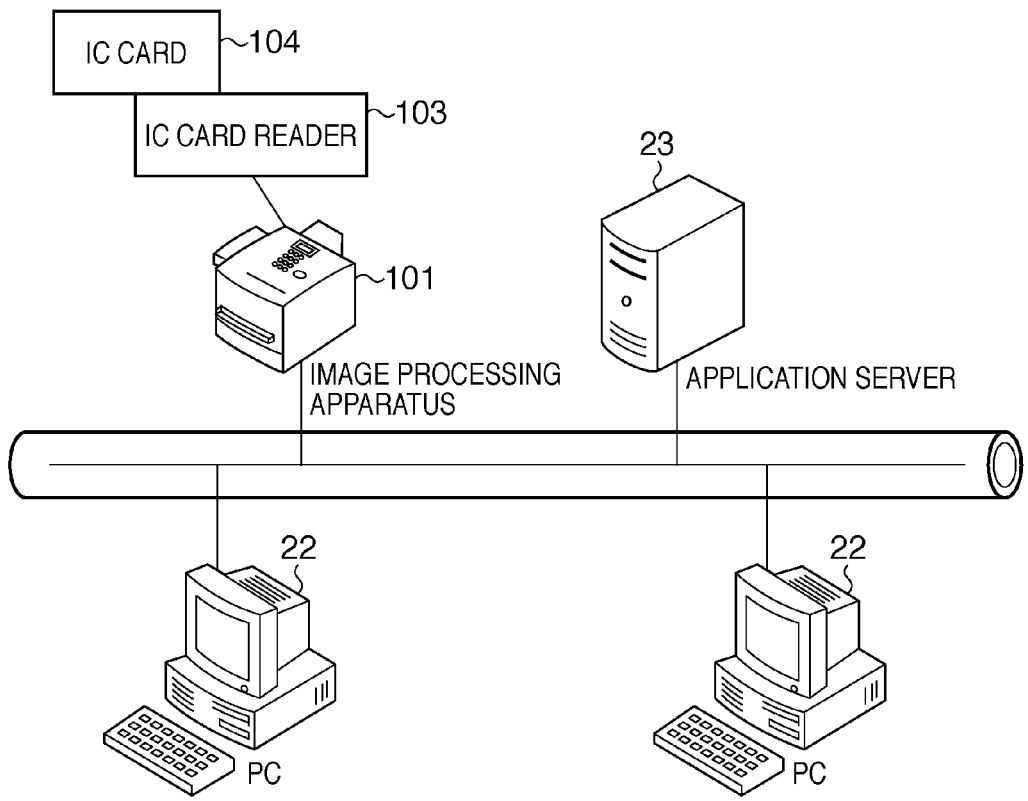
FIG. 2 is a system configuration in which the image processing apparatus according to the embodiment of the present invention is used.

FIG. 2 is a schematic view showing a system in which the image forming apparatus according to the embodiment of the present invention is used. In this system, the MFP 101, a plurality of PC terminals 22, and an application server 23 are communicably connected with each other via a network.

The MFP 101 supports a service provided by the application server 23, and regularly receives setting information set in the server 23, for example. The MFP 101 holds the received setting information in the RAM 212 or HDD 214, and operates based on the setting information by referring to it as needed.

FIG. 11 is a view showing program modules within the MFP 101. A UI control unit 1101 performs display control of an operation screen for the operation unit of the PC or the MFP 101 to remotely operate the MFP. A card reader control unit 1103 controls an IC card control unit 1104. The IC card control unit 1104 controls the IC card reader 103. An authentication API 1107 receives authentication information from a job management application 1110 of the application server 23, and passes it to an authentication management unit 1106. The authentication management unit 1106 also receives an input of authentication information from the UI control unit 1101 via an event management unit 1102. In this way, the authentication management unit 1106 receives the authentication information from the authentication API 1107 or UI control unit 1101. The authentication information contains information for specifying the user, such as a user ID and password. In addition, it is possible to input authentication information using an IC card, and this authentication information is also passed to the authentication management unit 1106.

The authentication management unit 1106 executes authentication processing by referring to an authentication information table. The authentication information table defines, for example, a user ID and authority given to the user, and is stored in, for example, the HDD 214. The authentication management unit 1106 searches the authentication information table using the input authentication information. If there is information in the table, which matches the authentication information, the authentication succeeds, and corresponding authority is given to the user. In this embodiment, the MFP locally performs an authentication service. The MFP, however, may transmit the authentication information to the server 23, and the server 23 may perform authentication. In this case, the server 23 responds to the MFP with information indicating whether the user of the input authentication information has been authenticated, and that indicating his/her authority if the user has been authenticated. There are some types of authentication services. In this embodiment, the authentication services include device authentication for authenticating the use authority of the MFP, and app authentication (which is an abbreviation for application authentication, and is also referred to as function-specific authentication) for authenticating the use authority for each function.

The UI control unit 1101 controls the displays of user interface screens shown in FIGS. 3 to 7, FIG. 9, and the like. These screens are displayed on the operation unit. These screens may also be displayed on an externally connected PC. An application module 1109 is part of firmware. The application module 1109 has a job management function, secure print function, and charging management function. The secure print function serves as a print function requiring authentication. Only after a print job for which a secure print has been specified is transmitted to the MFP, and the authorized user instructs to execute the job in the MFP, printed matter is output. For example, when trying to execute a print job held in the application server 23, the job management function within the application module 1109 is called through the authentication API 1107 in response to a job management instruction input by the UI control unit 1101. Note that the authentication API 1107 intervenes in this case, since the function-specific authentication service can be set for each function. When, for example, execution of the job management function is instructed, the authentication API 1107 determines whether the function-specific authentication service is set for the job management function. If the service is set, the authentication API 1107 executes the above-described authentication procedure. If it is determined that the authentication has succeeded and the authorized user has sent the instruction, the API 1107 calls the job management function of the application module 1109. The job management function transmits a request for a print job list to the job management application 1110 within the application server 23. In response to this, the job list is displayed on the operation unit 211 or the like under the control of the UI control unit 1101. The same goes for the secure print function or charging function. In FIG. 11, the application server 23 also manages print jobs. It is, however, possible to prepare a document management server separately from the application server to manage document data and print jobs.

Figure 3:
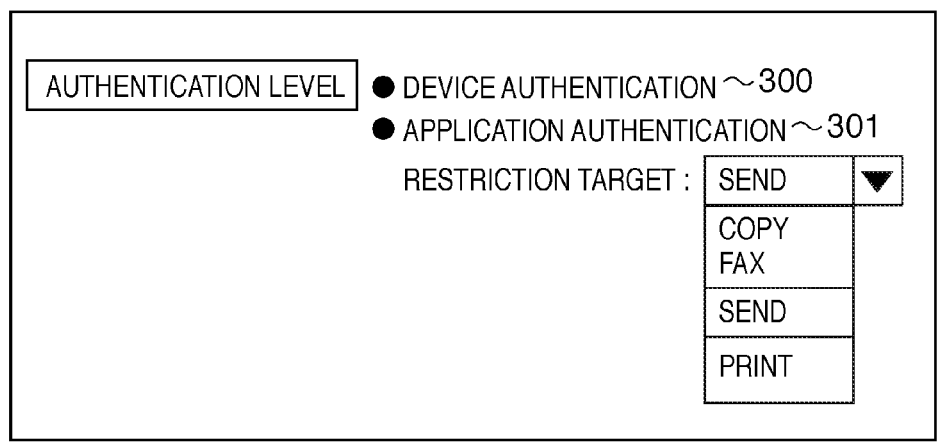
FIG. 3 is a view showing a setting screen example of an application server 23.

FIG. 3 shows a setting screen example of the MFP 101 in the application server 23. This screen enables to select a type of authentication service and functions to be authenticated. Setting information is saved in the server 23 unless it is specifically deleted. The setting information is transmitted in response to a request for the setting information, which is transmitted to the server 23 every time the MFP 101 starts. Unless, therefore, setting contents are changed, setting information containing the same contents is transmitted to the MFP 101 every time it starts.

Figure 4:
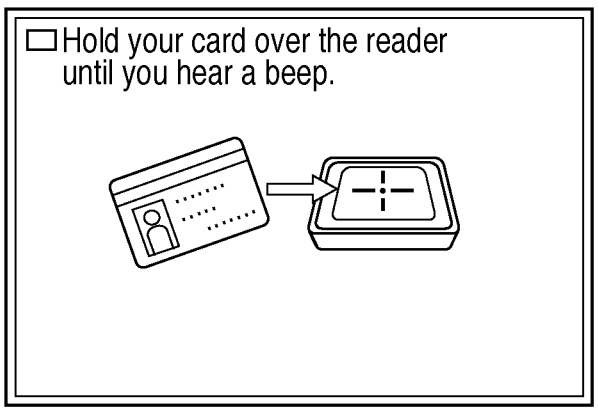
FIG. 4 is a view showing an authentication screen example of the image processing apparatus.

For example, when "device authentication" 300 is set as a type of authentication service, the setting information is saved, and transmitted to the MFP 101. Upon reception of the setting information, the MFP 101 requires device authentication every time it starts due to power-on or reset. At this time, the operation unit 211 of the MFP 101 displays an authentication screen as shown in FIG. 4. Unless the user undergoes user authentication, he/she cannot use the apparatus 101 itself.

Figure 5:
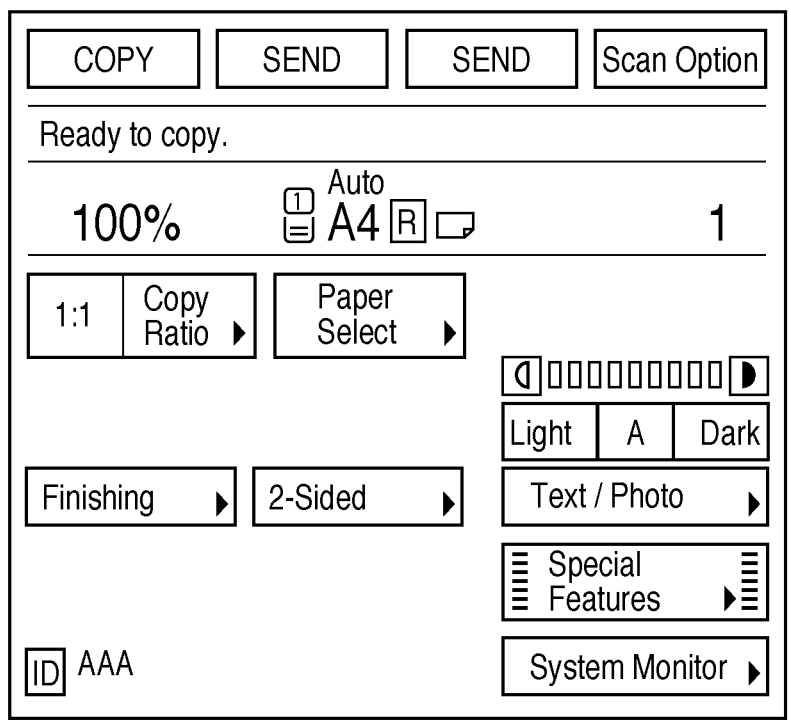
FIG. 5 is a view showing a copy function screen example of the image processing apparatus.
Figure 6:
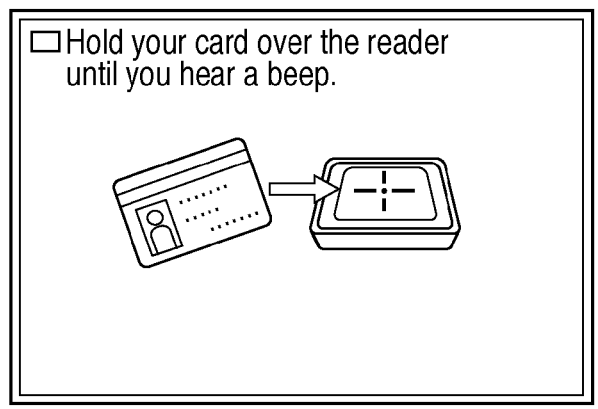
FIG. 6 is a view showing an authentication screen example displayed when user restriction is imposed on a SEND function.

On the contrary, assume that "application authentication" 301 is selected in the server 23 and a SEND function is set as a function to be authenticated (restricted) (see FIG. 3). In this case, the setting information is saved in the server 23, and then transmitted to the MFP 101. Upon reception of the setting information, the MFP 101 performs the application authentication which requires the user to undergo authentication when the use of the SEND function is instructed. When the authentication succeeds, the user can use the SEND function. Alternatively, it is possible to freely use functions (for example, a copy function) except for those to be restricted even if the user does not undergo authentication. In this case, the operation unit 211 displays a user interface screen as shown in FIG. 5. FIG. 5 shows a screen example when a copy button is selected. When the user presses a SEND button in FIG. 5 to use a function (in this case, the SEND function) to be restricted, the MFP 101 displays an authentication screen as shown in FIG. 6. Although not shown in FIG. 5, a button for a function to be restricted may be displayed with features for allowing to identify the function to be restricted.

Figure 9:
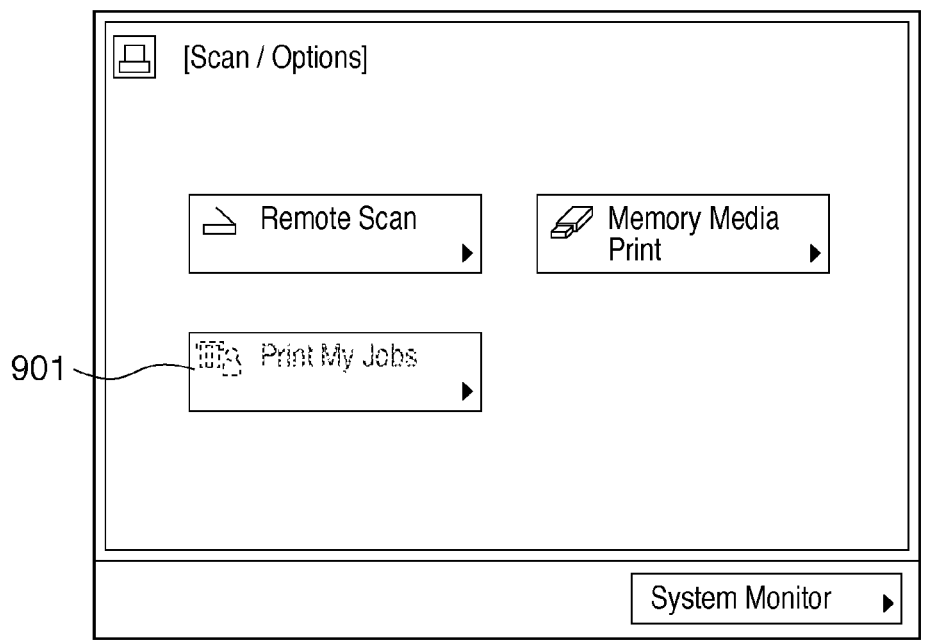
FIG. 9 is a view showing a display example of an operation unit when setting information from an authentication service has not been received.

When the user presses a SCAN OPTION button in FIG. 5, a screen shown in FIG. 9 is displayed. Note that the application authentication may be required depending on settings. In this case, when the MFP has not received setting information from the authentication service of the server 23, a key for a function requiring cooperation with the server, for example, a key 901 for a Print My Jobs function of downloading and executing a print job saved in the server 23 is grayed out. Alternatively, when the MFP has received setting information from the authentication service, this means that communication with the server 23 is possible, and thus the key for the Print My Jobs function is not grayed out. This operation will be described later.

Figure 7:
FIG. 7 is a view showing a screen example indicating that an MFP has not received setting information from a server 23, and is in a disabled state.

To start the MFP 101, there is no problem if the MFP 101 can receive the setting information from the server 23, and refer to it at a timing when there is enough time to perform start processing, that is, before processing which refers to the setting information is performed. However, it generally takes some time for the MFP 101 to receive setting information from the server 23. The MFP 101 cannot complete the start processing until it receives setting information from the server. Thus, conventionally, the operation unit 211 displays a screen for indicating that the MFP 101 is waiting for setting information, as shown in FIG. 7, thereby representing that the MFP 101 is waiting for reception of setting information from the server 23. That is, the user has to wait until the apparatus 101 becomes available.

Since in a setting with device authentication selected, the user cannot use all the functions of the MFP 101, it is impossible to circumvent waiting time before the MFP 101 enters a state in which authentication can be performed. When, however, the application authentication (function-specific authentication) is selected, it is desirable to be able to always use functions except for those to be restricted without waiting for reception of setting information from the server 23.

In some cases, for example, when the server 23 is down or a network failure has occurred, the apparatus 101 cannot receive setting information for a long time. In such situation, in spite of the fact that restriction targets are limited to only specific functions, it is impossible to use the MFP 101 itself including functions with no restriction for a long time.

The MFP 101 of this embodiment holds setting information last received from the server 23 in the HDD 214. If the MFP 101 has not received the setting information of the server 23 at startup, it can refer to the setting information stored in the HDD 214, and start based on the setting information. In particular, when the function-specific authentication is set, the operation unit displays as a UI screen an acceptance screen for accepting a user operation. Also, when the type of authentication service contained in the last received setting information indicates "authentication unnecessary", the operation unit also displays the acceptance screen for accepting a user operation. This allows to use functions which do not require authentication even when the MFP 101 is operating offline or the server is down.

Figure 8:
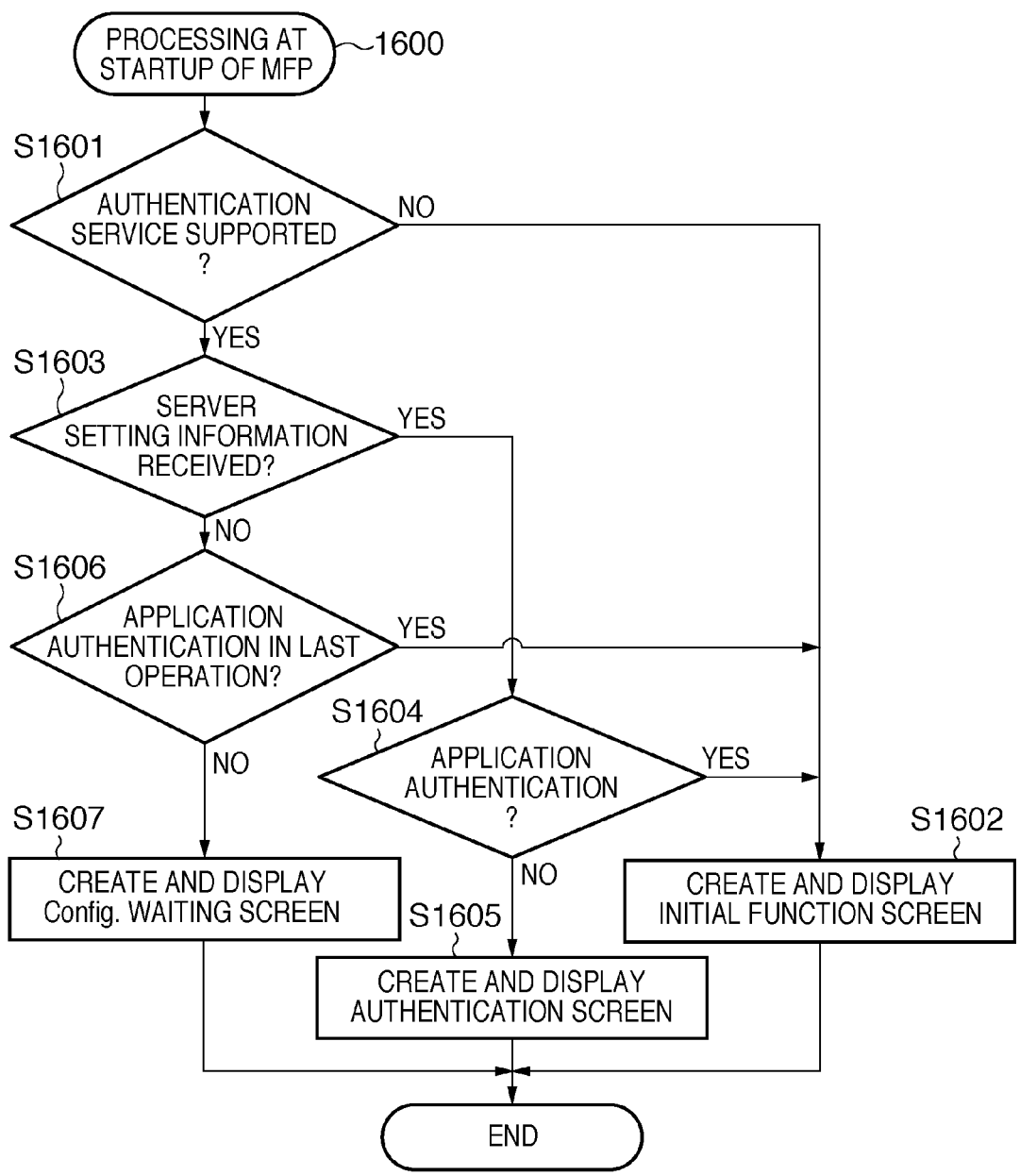
FIG. 8 is a flowchart illustrating the procedure of the start processing of an MFP 101.

FIG. 8 is a flowchart illustrating the above-described processing at the startup of the MFP 101, which is performed by the CPU 201. The procedure of FIG. 8 is executed as part of initialization processing such as power-on of the MFP 101, and may also be executed when setting information is changed in the server 23. Note that FIG. 8 shows the procedure focusing on the UI screen but other necessary processes at startup are performed, as a matter of course. Since the UI screen indicates to the user that the MFP becomes available, the procedure of FIG. 8 is executed near at the last stage of the processing at startup.

The MFP 101 determines whether it supports an authentication service (S1601) before determining whether the MFP 101 has received setting information from the server 23 after startup. If the MFP does not support the authentication service, it displays an acceptance screen for accepting a user operation on the operation unit. The MFP 101 displays, for example, a usual initial function screen as an acceptance screen (S1602). That is, if an initial function is a COPY function, the operation unit 211 of the MFP 101 displays a screen shown in FIG. 5.

If the MFP 101 supports the authentication service, the CPU 201 refers to the RAM 212, and determines whether the MFP has received setting information from the server 23 (S1603). An area of the RAM to be referred to is that in which information indicating reception of the setting information is recorded.

The MFP 101 having the configuration of this embodiment holds setting information last received in the last operation in a nonvolatile memory such as the HDD 214. If the MFP 101 is determined not to have received setting information in step S1603, it refers to the last received setting information held in the nonvolatile memory (S1606). If, for example, the type of authentication service contained in the setting information in the last operation is application authentication, the process advances to step S1602 to display the initial function screen, thereby starting the MFP. Alternatively, if the type of authentication service in the setting information received at the last startup, that is, the setting information in last operation is device authentication, the CPU 201 displays the screen shown in FIG. 7, thereby starting the MFP (S1607).

Even if the MFP has not received setting information from the application server 23, the process advances to step S1602 to display an operation acceptance screen, for example, the initial function screen of FIG. 5. In this state, when a "Scan Option" key in FIG. 5 is pressed, a display is controlled not to display a screen associated with a server-side application for the "Print My Jobs" function, as shown in FIG. 9. That is, the "Print My Jobs" key is grayed out or not displayed at all.

Figure 10:
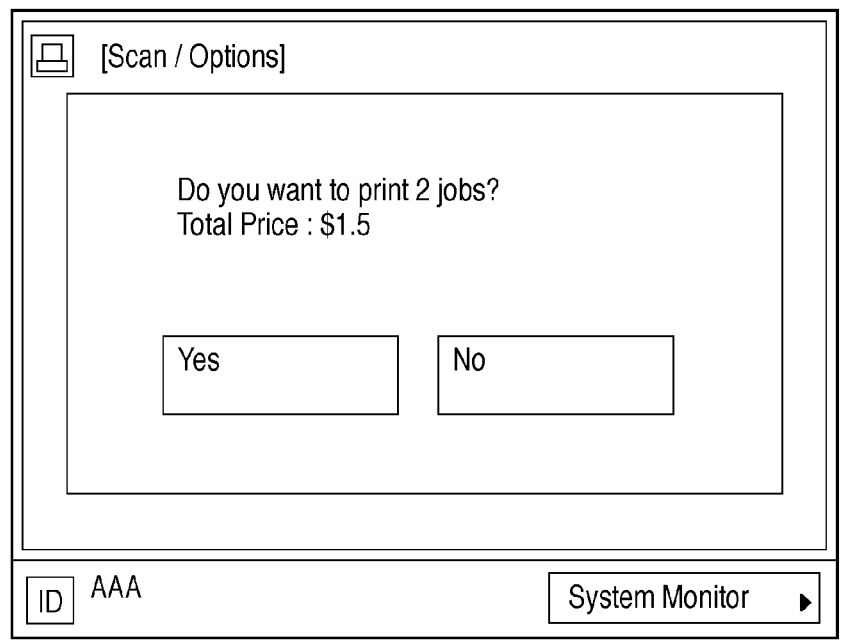
FIG. 10 is a view showing a display example of a confirmation screen.

Furthermore, if the MFP is determined in step S1603 to have received setting information from the application server 23, it determines whether the type of authentication service contained in the setting information is application authentication (S1604). If the type is determined to be application authentication, the process advances to step S1602 to display the operation acceptance screen of FIG. 5, for example, the initial function screen. Alternatively, if the type is determined to be not application authentication but device authentication, the MFP displays the authentication screen of FIG. 4 to enter an authentication waiting state (S1605). Note that in the display state of FIG. 5, when the "Scan Option" key is pressed, a display is controlled to display a screen associated with a server-side application for the "Print My Jobs" function, as shown in FIG. 9. That is, the "Print My Jobs" key becomes active. When the "Print My Jobs" key is pressed, the MFP displays a job selection screen, since authentication is complete if the device authentication is set. Subsequently, if a job is selected, the MFP displays a confirmation screen in FIG. 10. The job management function of the MFP 101 executes the "Print My Jobs" function. When, therefore, the application authentication is set for the job management function, user authentication is required. In this case, the MFP displays the authentication request screen of FIG. 6. If the authentication by an IC card or the like succeeds in response to this, the MFP displays a print job selection screen. When a job is selected, the MFP displays the confirmation screen of FIG. 10. This screen is based on text information pertaining to charging or job management, which is received from an application implemented on the server side. When the MFP 101 receives this information, the charging management function of the MFP 101 processes it, and causes the UI control unit 1101 to display the information. When the user positively responds through the confirmation screen, the selected print job is downloaded to the MFP 101, and then executed.

Although not shown, upon reception of setting information from the server 23, the MFP 101 copies the setting information, especially, information indicating a type of authentication service to a save area provided in a nonvolatile medium such as an HDD. This save area is referred to in step S1606 of FIG. 8. It is desirable to save the setting information (last setting information) of the save area in an area different from that in which the current setting information is saved in order to discriminate the last setting information from the setting information (current setting information) being currently referred to.

After the MFP 101 starts based on the last setting information before reception of setting information, the MFP 101 may receive setting information. In this case, the MFP 101 continues its operation according to the current setting information. If the MFP 101 is executing some function, it switches to the new setting information upon completion of the function. Consequently, since the MFP 101 operates according to the last setting information, the user with no use authority according to the current setting information may be using the MFP 101 or its function. If, for example, the last authentication service type is application authentication for a specified function, and the current authentication service type is device authentication, a user who is not authenticated yet may be using a function to which he or she is not entitled. In such case, while the MFP 101 executes no function, it displays a device authentication request screen, and transits to an authentication waiting state.

As described above, the MFP 101 switches to operate according to the current setting information at an appropriate timing such as during a free time.

Although this specification need not mention authentication processing, the MFP 101 can be connected with the IC card reader 103 communicable with the IC card 104. A system administrator previously delivers to the user the IC card 104 which records his/her individual authentication information. When the operation unit of the MFP 101 displays the authentication screen to require the user to perform authentication operation, the user holds the IC card 104 over the IC card reader 103. This causes the apparatus 101 to execute authentication processing by communicating with the server 23. Only when the authentication processing succeeds, the user can use the MFP 101.

Generally, there are two types of the IC cards, that is, a contact type and non-contact type. The IC card 104 may be either of them. Furthermore, the individual authentication means for the user is not necessarily the IC card 104, and an ID, a password, and a combination of them for enabling identification of the user may also be possible. In this case, the user performs the authentication operation by inputting, through the operation unit of the MFP 101, his/her own ID and password previously assigned by the system administrator.

Although the MFP 101 itself has an authentication table, and performs the authentication processing in this embodiment, the application server 23 or another authentication server may handle an actual authentication processing.

Although the HDD 214 is used as an example of a means for storing setting information in this embodiment, other memories except for an HDD may be used as long as the memories are nonvolatile.

As described above, even before reception of setting information after startup, the image forming apparatus of this embodiment refers to last received setting information, and starts in a state in which functions provided for specific users without the need for user authentication are available.

Second Embodiment

In the first embodiment, setting information last received from the server, that is, the actual value of setting information is used. On the contrary, in this embodiment, a nonvolatile storage means (for example, an HDD 214 or ROM 213) of an MFP 101 previously holds information containing minimum setting information necessary for starting the MFP 101, and this information is utilized. In this case, when the MFP 101 has not received setting information from a server 23, it refers to the previously stored value, and starts and operates based on that value.

When the MFP 101 has not received setting information, it is also possible to determine an operation state in accordance with the state of the MFP 101 or a network. For example, if the MFP 101 can communicate with the server even though it has not received setting information, the MFP 101 refers to the last print setting, and starts and operates, as in the first embodiment. Alternatively, if the MFP 101 cannot communicate with the server, it starts and operates in a predetermined mode. For example, the MFP requires device authentication.

As described above, even if the MFP has not received setting information, it is possible to use the MFP 101 by determining minimum settings required for startup in advance.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-104236, filed Apr. 28, 2010, which is hereby incorporated by reference herein in its entirety.

What is claimed is:

1. An image forming apparatus, comprising:
    a first determination unit that determines whether or not server setting information has been received when the image forming apparatus is activated by an activation instruction, wherein the server setting information is required to activate the image forming apparatus;
    a second determination unit that determines whether an authentication method of the image forming apparatus at the last activation is a device authentication or an application authentication, without displaying an authentication screen for requesting input of user information, when it is determined by the first determination unit that the server setting information has not been received, wherein the device authentication allows a user to use all functions of the image forming apparatus in response to successful authentication of the user and the application authentication allows a user to use a partial function of the image forming apparatus in response to successful authentication of the user; and
    a control unit that displays all functions of the image forming apparatus being disabled until reception of the server setting information if the authentication method at the last activation is determined to be the device authentication, and controls the image forming apparatus to disable a partial function which communicates with the server but to enable a remaining function if the authentication method at the last activation is determined to be the application authentication.

2. The apparatus according to claim 1, wherein the control unit displays a screen on which a user operates initial functions of the image forming apparatus if the authentication method at the last activation is determined to be the application authentication, and displays a screen indicating said partial function being disabled in response to an instruction to use said partial function.

3. The apparatus according to claim 1, wherein said partial function includes a print function for displaying charge information required to print, obtaining a print job held by the server in accordance with acceptance of payment, and printing the obtained print job.

4. The apparatus according to claim 1, wherein the second determination unit determines whether the authentication method of the image forming apparatus at the last activation is a device authentication or an application authentication based on the server setting information obtained from the server at the last activation.

5. The apparatus according to claim 1, wherein the control unit displays a button for use of said partial function in a manner that indicates said partial function being restricted in use.

6. A method of controlling an image forming apparatus, which is executed by the image forming apparatus, the method comprising:
    a first determination step of determining whether or not server setting information has been received when the image forming apparatus is activated by an activation instruction, wherein the server setting information is required to activate the image forming apparatus;
    a second determination step of determining whether an authentication method of the image forming apparatus at the last activation is a device authentication or an application authentication, without displaying an authentication screen for requesting input of user information, when it is determined in the first determination step that the server setting information has not been received, wherein the device authentication allows a user to use all functions of the image forming apparatus in response to successful authentication of the user and the application authentication allows a user to use a partial function of the image forming apparatus in response to successful authentication of the user; and
    a control step of displaying all functions of the image forming apparatus being disabled until reception of the server setting information if the authentication method at the last activation is determined to be the device authentication, and controlling the image forming apparatus to disable a partial function which communicates with the server but to enable a remaining function if the authentication method at the last activation is determined to be the application authentication.

7. The method according to claim 6, wherein a screen on which a user operates initial functions of the image forming apparatus is displayed in the control step if the authentication method at the last activation is determined to be the application authentication, and said control step displays a screen indicating said partial function being disabled in response to an instruction to use said partial function.

8. The method according to claim 6, wherein said partial function includes a print function for displaying charge information required to print, obtaining a print job held by the server in accordance with acceptance of payment, and printing the obtained print job.

9. The method according to claim 6, wherein second determination step determines whether the authentication method of the image forming apparatus at the last activation is a device authentication or an application authentication based on the server setting information obtained from the server at the last activation.

10. The method according to claim 6, wherein a button for use of said partial function is displayed in the control step in a manner that indicates said partial function being restricted in use.

11. A non-transitory computer-readable medium which stores code of a program that, when executed by a processor, causes an image forming apparatus to execute:
- a first determination step of determining whether or not server setting information has been received when the image forming apparatus is activated by an activation instruction, wherein the server setting information is required to activate the image forming apparatus;
- a second determination step of determining whether an authentication method of the image forming apparatus at the last activation is a device authentication or an application authentication, without displaying an authentication screen for requesting input of user information, when it is determined in the first determination step that the server setting information has not been received, wherein the device authentication allows a user to use all functions of the image forming apparatus in response to successful authentication of the user and the application authentication allows a user to use a partial function of the image forming apparatus in response to successful authentication of the user; and
- a control step of displaying all functions of the image forming apparatus being disabled until reception of the server setting information if the authentication method at the last activation is determined to be the device authentication, and controlling the image forming apparatus to disable a partial function which communicates with the server but to enable a remaining function if the authentication method at the last activation is determined to be the application authentication.

12. The non-transitory computer-readable medium according to claim 11, wherein a screen on which a user operates initial functions of the image forming apparatus is displayed in the control step if the authentication method at the last activation is determined to be the application authentication, and said control step displays a screen indicating said partial function being disabled in response to an instruction to use said partial function.

13. The non-transitory computer-readable medium according to claim 11, wherein said partial function includes a print function for displaying charge information required to print, obtaining a print job held by the server in accordance with acceptance of payment, and printing the obtained print job.

14. The non-transitory computer-readable medium according to claim 11, wherein the second determination step determines whether the authentication method of the image forming apparatus at the last activation is a device authentication or an application authentication based on the server setting information obtained from the server at the last activation.

15. The non-transitory computer-readable medium according to claim 11, wherein a button for use of said partial function is displayed in the control step in a manner that indicates said partial function being restricted in use.

* * * * *